(12) United States Patent
Manchanda et al.

(10) Patent No.: US 11,335,137 B2
(45) Date of Patent: May 17, 2022

(54) TRAINED PATTERN ANALYZER FOR ROLL OUT DECISIONS

(71) Applicant: CONDUENT BUSINESS SERVICES, LLC, Dallas, TX (US)

(72) Inventors: Sahil Manchanda, New Delhi (IN); Simarjot Kaur, Bangalore (IN); Arun Rajkumar, Chennai (IN); Narayanan Unny, Bangalore (IN)

(73) Assignee: Conduent Business Services, LLC, Florham Park, NJ (US)

( * ) Notice: Subject to any disclaimer, the term of this patent is extended or adjusted under 35 U.S.C. 154(b) by 80 days.

(21) Appl. No.: 16/375,931

(22) Filed: Apr. 5, 2019

(65) Prior Publication Data
US 2020/0320806 A1 Oct. 8, 2020

(51) Int. Cl.
| | |
|---|---|
| G07C 5/08 | (2006.01) |
| G05B 23/02 | (2006.01) |
| G08G 1/00 | (2006.01) |
| G06Q 10/00 | (2012.01) |
| G07C 5/00 | (2006.01) |

(52) U.S. Cl.
CPC ....... *G07C 5/0816* (2013.01); *G05B 23/0283* (2013.01); *G06Q 10/20* (2013.01); *G07C 5/006* (2013.01); *G08G 1/202* (2013.01)

(58) Field of Classification Search
CPC .... G06Q 10/04; G06Q 10/047; G06Q 10/063; G06Q 10/0631; G06Q 10/06313; G06Q 10/06315; G06Q 50/30; G06Q 10/20; B60R 16/0232; B60R 16/0234; G05B 23/0254;

(Continued)

(56) References Cited

U.S. PATENT DOCUMENTS

| | | | | |
|---|---|---|---|---|
| 5,566,092 A | * | 10/1996 | Wang | ........................ G07C 3/00 |
| | | | | 702/185 |
| 2002/0183866 A1 | * | 12/2002 | Dean | ........................ B61C 17/04 |
| | | | | 700/26 |

(Continued)

FOREIGN PATENT DOCUMENTS

| | | |
|---|---|---|
| CN | 200910064814 | 5/2009 |
| DE | 102014114202 A1 * | 3/2016 |

OTHER PUBLICATIONS

Fan, Yuantao, "A self-organized fault detection method for vehicle fleets", Halmstad University Dissertations No. 27, Halmstad University Press, 2016, 132 pages (Year: 2016).*

(Continued)

*Primary Examiner* — David A Testardi
(74) *Attorney, Agent, or Firm* — Jones Robb, PLLC

(57) ABSTRACT

A historical task database relating vehicle rollout decisions, vehicle maintenance states and subsequent deteriorations is created. A pattern analyzer may use an item-set mining algorithm on the task database to recommend whether a vehicle with its current maintenance state should be deployed. A supervisor uses this recommendation to make a rollout decision. These decisions are added to the database. Heuristic rules are defined to determine if the rollout decision was correct. The system to learns when a supervisor continues to make costly rollout errors. The system also discovers combinations of defects that lead to a rapid deterioration and makes recommendations that the vehicle be sent for maintenance rather than being rolled out.

12 Claims, 6 Drawing Sheets

(58) Field of Classification Search
CPC ............... G05B 23/0283; G07C 5/008; G07C 5/0808; G07C 5/006; G07C 5/0816; G08G 1/202
See application file for complete search history.

(56) References Cited

U.S. PATENT DOCUMENTS

| | | | |
|---|---|---|---|
| 2002/0184078 A1 | 12/2002 | Uyeki | |
| 2003/0055666 A1* | 3/2003 | Roddy | G06Q 10/06395 705/305 |
| 2009/0138141 A1* | 5/2009 | Nwadiogbu | G07C 5/0808 701/3 |
| 2009/0327011 A1* | 12/2009 | Petroff | G01C 21/3492 705/5 |
| 2010/0063668 A1* | 3/2010 | Zhang | G06Q 10/04 701/29.5 |
| 2010/0205021 A1* | 8/2010 | Jewett | G06Q 10/06 705/7.23 |
| 2011/0029804 A1 | 2/2011 | Hadden et al. | |
| 2011/0301807 A1* | 12/2011 | Staaf | G06Q 10/06 701/29.3 |
| 2011/0301988 A1* | 12/2011 | Staaf | G06Q 10/06 705/7.11 |
| 2014/0052499 A1* | 2/2014 | Wagner | G07C 5/008 705/7.36 |
| 2016/0035150 A1* | 2/2016 | Barfield, Jr. | G05B 23/0254 701/29.3 |
| 2016/0052470 A1* | 2/2016 | Shore | G07C 5/06 701/29.1 |
| 2016/0062356 A1* | 3/2016 | Worden | G05D 1/0022 701/2 |
| 2016/0063418 A1* | 3/2016 | Roddy | G06Q 10/06315 705/7.25 |
| 2016/0078695 A1* | 3/2016 | McClintic | G07C 5/0816 701/29.4 |
| 2016/0093119 A1* | 3/2016 | Ahn | G07C 5/008 701/29.3 |
| 2016/0133066 A1* | 5/2016 | Lavie | G07C 5/08 701/31.4 |
| 2016/0253851 A1* | 9/2016 | Pandey | G07C 5/0808 701/31.4 |
| 2017/0109222 A1* | 4/2017 | Singh | G06F 11/079 |
| 2018/0046961 A1* | 2/2018 | Tulabandhula | G08G 1/202 |
| 2018/0121824 A1* | 5/2018 | Han | G06F 16/244 |
| 2018/0335772 A1* | 11/2018 | Gorinevsky | G05B 23/0283 |
| 2019/0066407 A1* | 2/2019 | Kwak | G07C 5/008 |
| 2019/0197798 A1* | 6/2019 | Abari | G06Q 10/02 |
| 2019/0220036 A1* | 7/2019 | Weslosky | G07C 5/08 |
| 2019/0244442 A1* | 8/2019 | Kyes | G07C 5/008 |
| 2019/0244445 A1* | 8/2019 | Kyes | G07C 5/0808 |
| 2019/0318549 A1* | 10/2019 | Zeira | G06Q 10/20 |
| 2019/0324430 A1* | 10/2019 | Herzog | G07C 5/006 |
| 2020/0051347 A1* | 2/2020 | Bohl | G07C 5/008 |
| 2020/0090419 A1* | 3/2020 | Rajkumar | G07C 5/06 |
| 2020/0279345 A1* | 9/2020 | Jiwani | G06Q 10/063112 |
| 2020/0320806 A1* | 10/2020 | Manchanda | G07C 5/006 |
| 2021/0016786 A1* | 1/2021 | Griffiths | B60W 50/14 |
| 2021/0065481 A1* | 3/2021 | Zang | G08G 1/22 |

OTHER PUBLICATIONS

Wikipedia article, "Human brain", Old revision dated Mar. 31, 2019, 42 pages (Year: 2019).*
Mbuli, John et al., "Specifying a condition-based maintenance decision support system for a fleet of cyber-physical systems", Proceedings of SOHOMA'18, Conference date: Jun. 11-12, 2018, Bergamo, Italy, pp. 285-294. (Year: 2018).*
Manchanda, Sahil et al., "SUPAID: A Rule mining based method for automatic rollout decision aid for supervisors in fleet management", arXiv:2001.03386v2 [cs.LG], submitted to ArXiv on Jan. 15, 2020, 16 pages (Year: 2020).*
Wikipedia article, "Apriori algorithm", Old revision dated Mar. 15, 2019, 5 pages (Year: 2019).*
Wikipedia article, "Artificial neural network", Old revision dated Apr. 4, 2019, 48 pages (Year: 2019).*
DeepAI, "What is Weight (Artificial Neural Network)?", retrieved Nov. 30, 2021, 1 page, retrieved from: https://deepai.org/machine-learning-glossary-and-terms/weight-artificial-neural-network (Year: 2021).*
Abuaqel, Ibrahim et al., "Prediction Models Aided Postoperative Decision Making Based on Neural Network and Support-Vector Machines." IEEE, Riyadh, Saudi Arabia, Date of Conference Feb. 21-23, 2017. Link: https://ieeexplore.ieee.org/document/7899137/ authors.
Alaggia, Sebastian et al., "Vehicle Scheduling for Suburban Public Transport." IEEE, Naiguata, Venezuela, Date of Conference Oct. 7-11, 2013. Link: https://ieeexplore.ieee.org.document/6670670/. DOI: 10.1109/CLEI.2013.6670670.
Kargupta, Hillol et al., "VEDAS: A Mobile and Distributed Data Stream Mining System for Real-Time Vehicle Monitoring." 2004 SIAM International Conference on Data Mining. Link: https://epubs.siam.org/doi/abs/10.1137/1.9781611972740.28, (2004).
Ng, H. K. et al., "A Vehicle Health Monitoring System Evaluated Experimentally on a Passenger Vehicle." IEEE Transactions on Control Systems Technology 14:5:854-870 (Sep. 2006). Date of Publication: Aug. 7, 2006. Link: https://ieeexplore.ieee.org/document/1668148/.
Unknown Author, "Vehicle Allocation Methodology" Mercury Associates, Inc. https://www.documents.dgs.ca.gov/ofa/fleetreduction/vamintroductionrl.pdf, (submitted 2019).

* cited by examiner

TRAINED PATTERN ANALYZER FOR ROLL OUT DECISIONS

TECHNICAL BACKGROUND

The decision to roll out a particular vehicle (e.g., bus) from among a fleet of vehicles (or not) is typically made by a fleet supervisor. These decisions are based on the supervisor's experience. However, the supervisor's prior experiences may have gaps or flaws unknown even to the supervisor themselves. Thus, the supervisor may make a decision that lead to a deterioration of a rolled-out the vehicle and/or the fleet as a whole. Providing a way to reduce the number of decisions leading to the deterioration of vehicles can lead to a cost-savings, improve the safety of the fleet, and point out gaps and flaws in the supervisor's decision making process.

OVERVIEW

In an embodiment, a method includes determining, from a historical database that relates, for a fleet of vehicles, defect indicators, supervisory actions, and results, a plurality of defect indicator groupings that meet a first threshold criteria corresponding to a likelihood that an action leads to a given vehicle becoming unavailable. The defect indicator grouping is generated based on an assumption that a supervisory action to remove a respective vehicle from service is always correct. The method further includes, based on at least one of the defect indicator groupings, and a set of defect indicators associated with a subject vehicle, generating a score for the subject vehicle. The method further includes determining whether the score for the subject vehicle meets a second threshold criteria. The method further includes outputting information based on the determination of whether the score for the subject vehicle meets the second threshold criteria.

In an embodiment, a method includes providing a task database to a pattern analyzer. The task database includes respective historical defect indicators associated with respective vehicles of a set of vehicles and at least one supervisory decision. The pattern analyzer determines, based on an assumption that supervisory decisions to remove a respective vehicle from service is substantially always correct, for a plurality of sets of historical defect indicators, key-value pairs corresponding to respective sets of historical defect indicators and a respective ratio corresponding to a first frequency of vehicles being taken out of service to a second frequency of vehicles remaining in service. The method further includes providing the pattern analyzer with respective current sets of defect indicators associated with a current status of respective vehicles of the set of vehicles. The pattern analyzer, based on the respective current sets of defect indicators and the key-value pairs, determines confidence scores that correspond to a likelihood the respective vehicle of the set of vehicles will remain in service. The method further includes providing an alert generating module with the confidence scores. The method further includes outputting information about at least one vehicle of the set of vehicles based on the confidence scores.

In an embodiment, a method includes receiving a historical database of supervisory decisions that relates defect indicators, actions, and results. Based on the historical database, and an assumption that supervisory decisions to remove a respective vehicle from service is substantially always correct, groupings of defect indicators that meet a first threshold criteria corresponding to a likelihood that an action leads to a first result are generated. The method further includes, based on at least one of the groupings of defect indicators, and a set of defect indicators associated with a vehicle, generating a score for the vehicle. The method further includes determining whether the score for the vehicle meets a second threshold criteria. The method further includes outputting information based on the determination of whether the score for the vehicle meets the second threshold criteria.

DETAILED DESCRIPTION

In an embodiment, vehicle fleet maintenance costs are reduced by improving and automating rollout decisions. A historical task database relating vehicle rollout decisions, vehicle maintenance states and subsequent deteriorations is created. A pattern analyzer then uses an item-set mining algorithm on the task database to recommend whether a vehicle with its current maintenance state should be deployed. A supervisor uses this recommendation to make a rollout decision. These decisions are added to the database. Heuristic rules are defined to determine if the rollout decision was correct. This enables the system to learn when a supervisor continues to make costly rollout errors. The system also discovers combinations of defects that lead to a rapid deterioration and makes recommendations that the vehicle be sent for maintenance rather than being rolled out.

Figure 1:
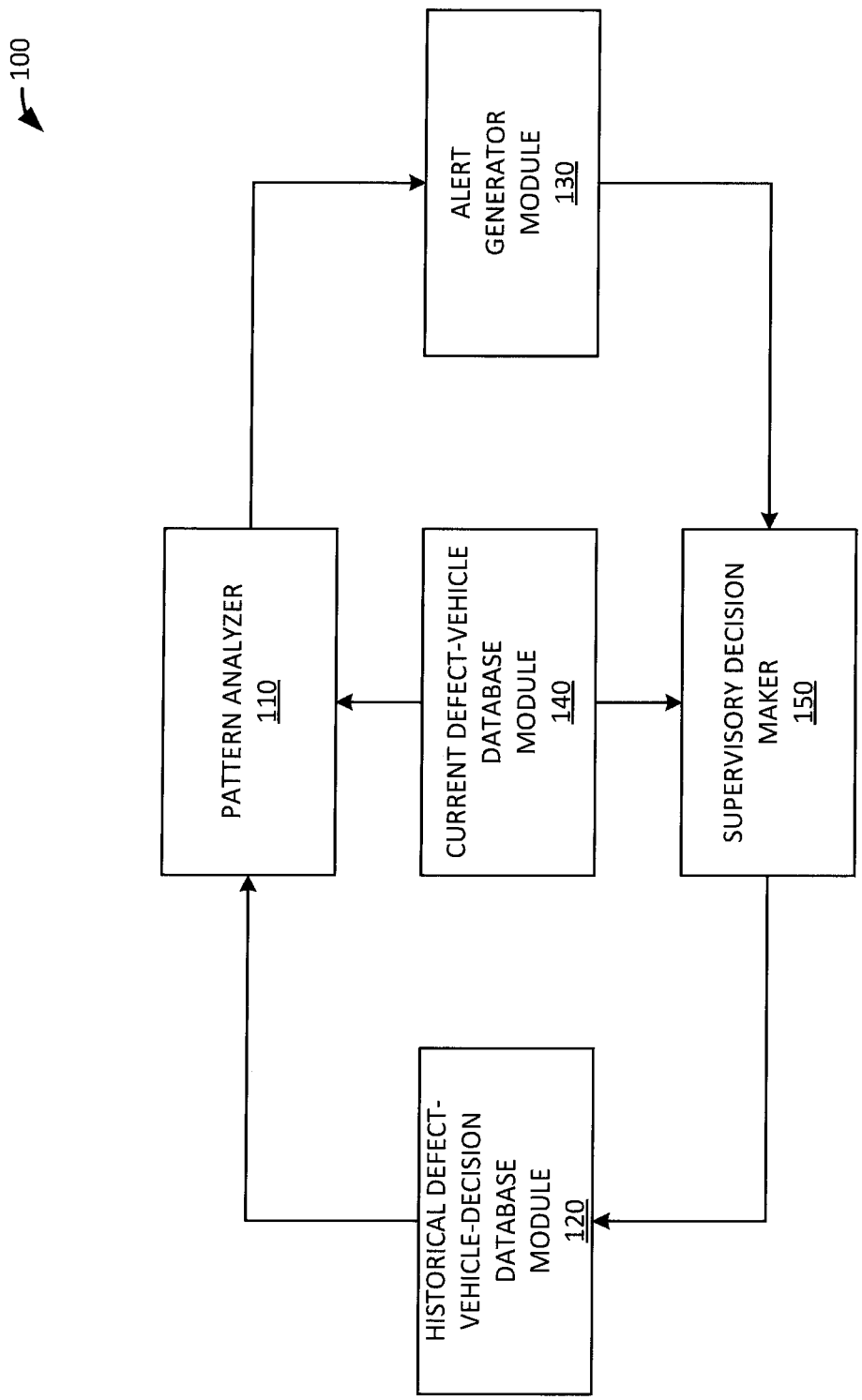
FIG. 1 is a block diagram of a decision assistance system.

FIG. 1 is a block diagram of a decision assistance system. In FIG. 1, system 100 comprises pattern analyzer 110, historical defect-vehicle-decision database module 120, alert generator module 130, and current defect-vehicle database module 140. Historical defect-vehicle-decision database module 120 is configured and operatively coupled to receive input from supervisory decision maker 150 and provide output to pattern analyzer 110. Pattern analyzer 110 is configured and operatively coupled to receive input from historical defect-vehicle-decision database module 120, receive input from current defect-vehicle database module 140, and provide output to alert generator module 130. Current-defect-vehicle database module 140 is configured and operatively coupled to provide output to pattern analyzer 110 and supervisory decision maker 150. Alert generator module is configured and operatively coupled to supervisory decision maker 150.

In an embodiment, a historical defect-vehicle-decision database module 120 contains a history of all the defects/tasks (i.e., repairs, maintenance, unrepaired problems) that have occurred in association with each vehicle in the fleet. In particular vehicle database module 120 contains information about the supervisory decision maker 150's decisions whenever a particular defect set was encountered. The supervisory decision maker 150's decision could be to either place a particular vehicle in service (i.e., roll out) or to not place that vehicle in service (i.e., don't roll out.) The historical defect-vehicle-decision database module 120 is operatively coupled to pattern analyzer 110.

The pattern analyzer 110 takes as input the historical defect data from historical defect-vehicle-decision database module 120. From the historical defect data, the pattern analyzer 110 develops item sets of defects which, if present, are associated with a significant proportion of transitions to an out-of-service state as compared remaining in service. Pattern analyzer 110 also receives the corresponding in/out of service decisions made in the historical defect data and compares it to information from the current defect-vehicle database 140 in order check if there are currently any vehicles in the fleet with sets of defects that might lead to a 'worse' state of that vehicle if that vehicle is placed in service. If such a set of defects is found, they are sent to the alert generator module 130.

The alert generator module 130 receives, from the pattern analyzer 110 (possibly empty) sets of defects from the current defect-vehicle database 140 and associated confidence scores. These confidence scores indicate the possibility that the state of the vehicle will deteriorate in the next couple of days. The alert generator 130 generates and displays the alerts to the supervisory decision maker 150 (e.g., human supervisor). These alerts may be displayed in a fashion that indicates the severity of the problem detected. (e.g. red alert if the confidence is above a certain threshold, orange alert for a medium confidence problem and so on.)

The current defect-vehicle database 140 contains the list of defects associated with a vehicle in its current state. This may be fetched from a maintenance database (not shown in FIG. 1.) The supervisory decision maker 150 may be a human or an entity that makes the actual in or out of service decision. The alerts may be provided to the supervisory decision maker 150 as an aid. The supervisory decision maker 150, however, can choose to override the alerts and make their own in or out of service decision. The decisions made by the supervisory decision maker 150 are recorded in the historical defect-vehicle-decision database module 120 to complete a feedback loop.

An example, in table form, of raw historical defect-vehicle-decision data is illustrated. As you can see in Table 1, on 1 Jan. 2017, for vehicle 1 there were 3 pending defects 'D1, D2, D3' and vehicle 1 was marked AVAILABLE by the supervisor.

TABLE 1

| Vehicle Id | TimeStamp of observation | Defects | Vehicle Status |
| --- | --- | --- | --- |
| 1 | 1 Jan 2017 | D1, D2, D3 | AVAILABLE |
| 1 | 2 Jan 2017 | D1, D2, D3, D4 | AVAILABLE |
| 1 | 3 Jan 2017 | D1, D2, D3, D4 | DOWN |
| 1 | 4 Jan 2017 | D1, D2 | AVAILABLE |
| 1 | 5 Jan 2017 | D1, D2 | AVAILABLE |
| 2 | 12 March 2017 | D6, D7 | AVAILABLE |
| 2 | 14 March 2017 | D6, D7, D8 | AVAILABLE |
| 2 | 15 March 2017 | D6, D7, D8 | DOWN |
| 2 | 16 March 2017 | D6 | AVAILABLE |

The raw historical defect-vehicle-decision data is used to produce a labeled data set. In producing the labeled data set the following definitions may be used. The 'defect state' of a vehicle at a time (e.g., date) is the set of defects which are known to be unrepaired (a.k.a., resolved) at that time. For example, if pending defects (and/or yet-to-be-done but due maintenance tasks) D0, D1, and D2 are present in a vehicle V at time T, then 'defect state' of the vehicle V at time T may be denoted as {D0, D1, D2}. The 'defect state' may also be set to 'bad defect state' if the status of the vehicle is in DOWN state at least a threshold percentage (e.g., 85%) of the time. For example, if the defect state of vehicle V is {D0, D1}, and in the dataset {D0, D1} (across all vehicles and days) is marked as DOWN 20 times and AVAILABLE 2 times then {D0, D1} is considered as bad defect state since 20/(20+2)=90%>85%. It is also possible that some defect combinations have never occurred or have not occurred enough times to be meaningful (e.g., D1 has never occurred with D7, or has only occurred 1 time in that combination.) In these cases, for example, the defect combination may be ignored if it has not occurred a threshold number of times.

A transition of a vehicle from day d to day d+1 is marked as 'remains available' if the status of the vehicle on day d is 'Available' and day d+1 (i.e., the next day) is also 'available.' A transition for a vehicle from day d to day d+1 is marked as 'becomes down' if the status of the vehicle on day d is 'available' but on day d+1 it is 'down' and the defect state of the vehicle on day d+1 is a 'bad defect state'.

Table 2 includes example pseudo-code to create a labeled data set. Table 3 illustrates an example form of a labeled data set.

TABLE 2

1. Group rows according to each vehicle.
2. For each group/vehicle:
    For each Observation 'i' in the group
        If(Observation [i]->Vehicle_Status == AVAILABLE and
            Observation [i+1]-> Vehicle_Status == DOWN and
            Observation [i+1]-> Defects ∈ Bad_State ) then
                Label = BECOMES_DOWN
        If (Observation [i]-> Vehicle_Status == AVAIL and
            Observation [i+1]-> Vehicle_Status == AVAIL) then
                Label = REMAINS_AVAIL
    Else:
        Ignore the Observation 'i'.

TABLE 3

| Vehicle Id | Time Stamp | Defects | Current Status | Next Status | Label |
| --- | --- | --- | --- | --- | --- |
| 1 | 1 Jan 2017 | D1, D2, D3 | AVAILABLE | AVAILABLE | REMAINS AVAILABLE |
| 1 | 2 Jan 2017 | D1, D2, D3, D4 | AVAILABLE | DOWN | BECOMES DOWN |
| 1 | 4 Jan 2017 | D1, D2 | AVAILABLE | AVAILABLE | REMAINS AVAILABLE |
| 1 | 5 Jan 2017 | D1, D2 | AVAILABLE | AVAILABLE | REMAINS AVAILABLE |
| 2 | 12 Mar 2017 | D6, D7 | AVAILABLE | AVAILABLE | REMAINS AVAILABLE |
| 2 | 13 Mar 2017 | D6, D7, D8 | AVAILABLE | AVAILABLE | REMAINS AVAILABLE |
| 2 | 15 Mar 2017 | D6, D7, D8 | AVAILABLE | DOWN | BECOMES DOWN |

Pattern analyzer 110 may use item-set mining is used to select the subsets of defects which lead to DOWN state of vehicle frequently. In particular, it is assumed that the supervisor is one-way efficient. A one-way efficient supervisor is one who is always correct when a 'no roll out' decision is made, but can be wrong when making a 'roll-out' decision. An apriori based frequent pattern algorithm is used to mine defect patterns which are frequent in the dataset and have led to failures when a supervisor makes a roll out decision. When such a defect pattern appears in the data received from the current defect-vehicle database module 140, alert generator module 130 alerts the supervisory decision maker 150 regarding the possible consequences of a roll out decision. Thus, the system serves as a tool for the supervisory decision maker 150 and aids in making better roll out decisions.

Table 4 illustrates example 'remains available' training data. Table 5 illustrates example 'becomes down' training data.

TABLE 4

| Row # | Defect state | Label |
|---|---|---|
| 1 | {D1, D2, D3} | Remains available |
| 2 | {D1, D2} | Remains available |
| 3 | {D1, D2} | Remains available |
| 4 | {D6, D7} | Remains available |
| 5 | {D1, D4, D6, D8} | Remains available |

TABLE 5

| Row # | Defect state | Label |
|---|---|---|
| 1 | {D1, D2, D3, D4} | Becomes down |
| 2 | {D6, D7, D8} | Becomes down |
| 3 | {D1, D3, D4, D8} | Becomes down |
| 4 | {D1, D4, D8, D9} | Becomes down |

Table 6 includes example pseudo-code to generate key-value pairs of sets of defects.

TABLE 6

1. Divide data into two sets based upon 'Remains Available' and 'Becomes Down'.
2. Let $T_1$ be the set of observations labelled as 'Remains Available'. Let $T_2$ be the set of observations labelled as 'Becomes Down'.
3. Find all the item-sets of defects using item-set mining algorithm separately for both datasets.
4. Let Item_sets_ratio be a key-value pair variable which holds the ratio of how many times an item-set defects appears in 'Becomes Down' vs 'Remains Available'.
5. For each item-set of defects:
   a. frequency_remains_available = |{t∈ $T_1$; item-set ⊆ t}| . This is the count of item-set in 'Remains Available' labelled Dataset.
   b. frequency_becomes_down = |{t∈ $T_2$; item-set ⊆ t}| . This is the count of item-set in 'Becomes Down' labelled Dataset.
   c. Item_sets_ratio[item-set] = 'frequency_becomes_down'/ 'frequency_remains_available'

In an embodiment, pattern analyzer 110 may comprise an artificial neural network (e.g., restricted Boltzmann machine or convolution neural network) that is trained using the assumption that the supervisor is one-way efficient. A one-way efficient supervisor is one who is always correct when a 'no roll out' decision is made, but can be wrong when making a 'roll-out' decision. The same or similar training data described herein may be used to train the neural network.

Once trained, pattern analyzer 110 receives information from current defect-vehicle database module 140. Pattern analyzer 110 can create a score for each current vehicle. This score can aid supervisory decision maker 150 in making roll out decisions. Tables 7 and 8 include example pseudo-code to generate a score for a vehicle.

TABLE 7

1. Find the pending defects in the vehicle on the particular day. Call it as S.

TABLE 7-continued

2. Max_Score = 0
3. For each subset K of S:
   If (K is present in Item_sets_ratio):
      I. Score = Item_sets_ratio[K]
      II. If (Score > Max_Score):
         Max_Score = Score
4. Score of vehicle = Max_Score Note:
If for a state S, there is no subset K which is present in Item_sets_ratio, then a score of 0 (zero) is given.

TABLE 8

1. Find the pending defects in the vehicle on the particular day. Call it as S.
2. Max_Score = 0
3. For item_set in Item_sets_ratio:
   intersection_set = item_set ∩ S
   if intersection_set ∈ Item_sets_ratio:
      Score = Item_sets_ratio[intersection_set]
      if (Score > Max_Score):
         Max_Score = Score
4. Score of vehicle = Max_Score Note 1:
Item_sets_ratio[∅] = 0.
Note 2:
∩ is the intersection operator.
Note 3:
∈ refers to set membership operator.
Note 4:
∅ refers to the empty set.

Once scores are generated for each vehicle's current set of defects (if any), the vehicles may be ranked based on the scores. In addition, the scores may be compared to a threshold to classify vehicles as either 'down or 'available.' The threshold may be determined by separating the information in the entire defect-vehicle-decision database module 140 into training data, validation data, and testing data.

Figure 2:
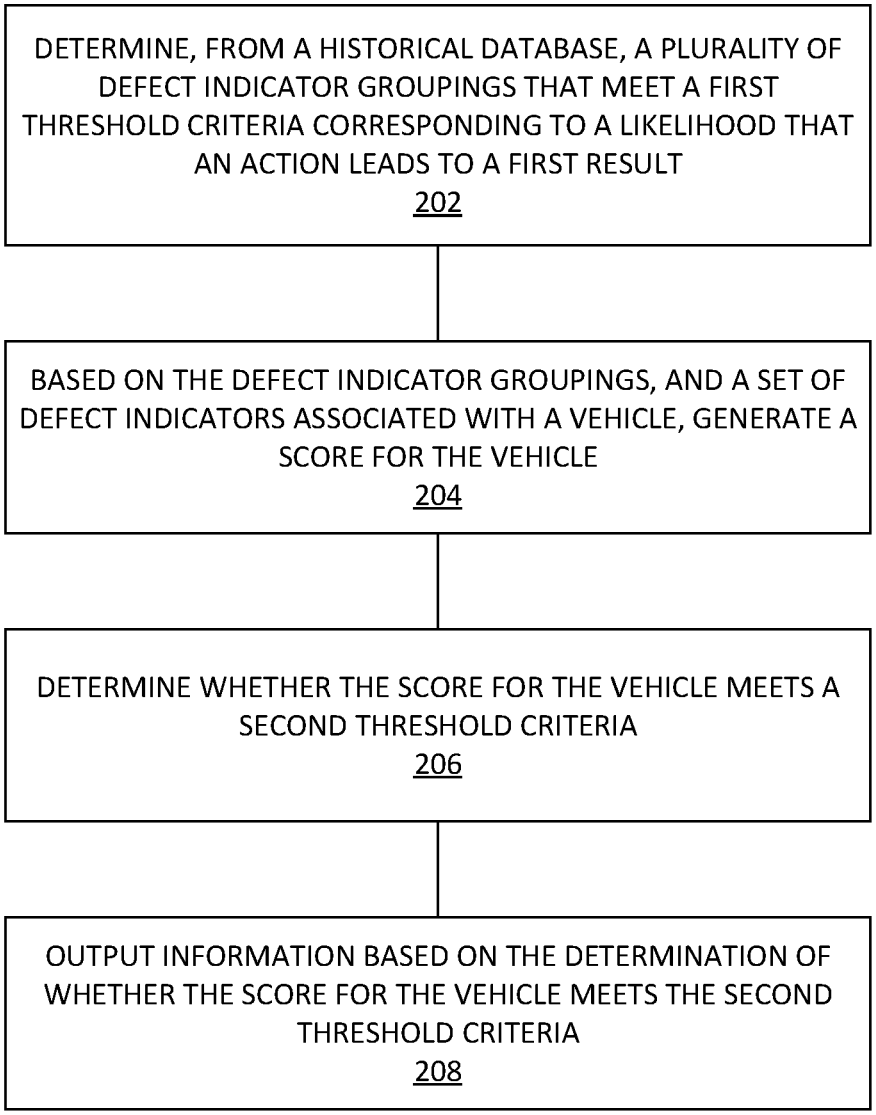
FIG. 2 is a flowchart illustrating a method of providing break down likelihood indicators.

FIG. 2 is a flowchart illustrating a method of providing break down likelihood indicators. The steps illustrated in FIG. 2 may be performed by one or more elements of system 100. From a historical database, a plurality of defect indicator groupings are determined that meet a first threshold criteria corresponding to a likelihood that an action leads to a first result (202). For example, pattern analyzer 110 may receive information from historical defect-vehicle-decision database module 120. Pattern analyzer 110 may, based on the historical defect data, develop item sets of defects which, if present, are associated with a significant proportion of transitions to an out-of-service state as compared remaining in service (e.g., a breakdown). The results may correspond to whether vehicles in a set of vehicles subsequently became unavailable after being subject to an action. The actions may correspond to whether respective vehicles in the set of vehicles were placed in service. The historical database may be derived from supervisory decisions to place respective vehicles in the set of vehicles into service. The defect indicator groupings may assume that the supervisory decisions to not place a respective vehicle into service is always correct.

Based on the defect indicator groupings, and a set of defect indicators associated with a vehicle, a score is generated for the vehicle (204). For example, pattern analyzer 110 may also receive the corresponding in/out of service decisions made in the historical defect data and compare it to information from the current defect-vehicle database 140.

This information may be used to generate a scores associated with the likelihoods that particular vehicles may deteriorate if placed in service.

Whether the score for the vehicle meets a second threshold criteria is determined (206). For example, pattern analyzer 110 may compare the scores associated with the vehicles to a threshold to determine which vehicles are likely to deteriorate (or break-down). In another example, pattern analyzer 110 may sort the vehicles according to the scores associated with the respective vehicles. The number of vehicles needed in service may then be used to determine a minimum threshold score of the vehicles to be deployed.

Information based on the determination of whether the score for the vehicle meets the second threshold criteria is output (208). For example, alert generator module 130 may receive, from pattern analyzer 110, (possibly empty) sets of defects from the current defect-vehicle database 140 and associated confidence scores. These confidence scores indicate the possibility that the state of the vehicle will deteriorate in the next couple of days. The alert generator 130 may then generate and display alerts to the supervisory decision maker 150 (e.g., human supervisor). These alerts may be displayed in a fashion that indicates the severity of the problem detected. (e.g. Red alert if the confidence is above a certain threshold, orange alert for a medium confidence problem and so on.)

Figure 3:
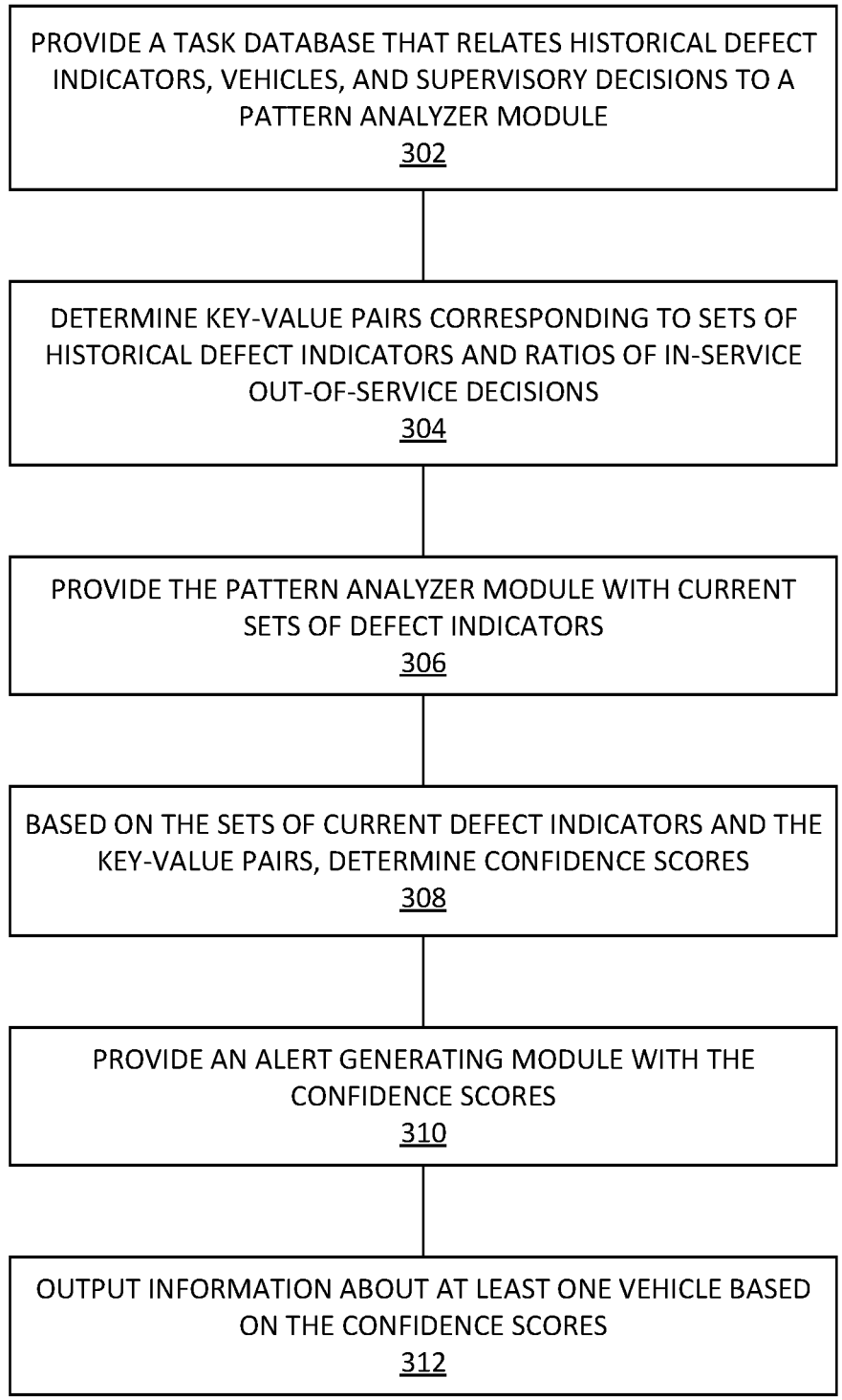
FIG. 3 is a flowchart illustrating a method of providing confidence scores.

FIG. 3 is a flowchart illustrating a method of providing confidence scores. The steps illustrated in FIG. 3 may be performed by one or more elements of system 100. A task database that relates historical defect indicators, vehicles, and supervisory decisions is provided to a pattern analyzer. For example, historical defect-vehicle-decision database module 120 may provide information to pattern analyzer 110.

Key-value pairs corresponding to sets of historical defect indicators and rations of in-service out-of-service decisions are determined (304). For example, pattern analyzer 110 may determine, for a plurality of sets of historical defect indicators received from historical defect-vehicle-decision database module 120, key-value pairs corresponding to respective sets of historical defect indicators and respective ratios corresponding to a frequency of vehicles being taken out of service and a frequency of vehicles remaining in service.

The pattern analyzer is provided with current sets of defect indicators (306). For example, current defect-vehicle database module 140 may supply pattern analyzer 110 with information about the defects currently associated with each vehicle. Based on the sets of current defects, and the key-value pairs, confidence scores are determined (308). For example, based on the information from current defect-vehicle database module 140, and the key value pairs developed in box 304, pattern analyzer 110 may generate a score for each vehicle. This score can correspond to the likelihood that a vehicle will (or won't) be placed in to service.

The confidence scores are provided to an alert-generating module (310).

For example, alert generator module 130 may receive, from the pattern analyzer 110 (possibly empty) sets of defects from the current defect-vehicle database 140 and associated confidence scores. These confidence scores may indicate the possibility that the state of the vehicle will deteriorate in the next couple of days.

Information is output about at least one vehicle based on the confidence scores (312). For example, alert generator 130 may generate and display alerts to the supervisory decision maker 150 (e.g., human supervisor). These alerts may be displayed in a fashion that indicates the severity of the problem detected. (e.g. red alert if the confidence is above a certain threshold, orange alert for a medium confidence problem and so on.)

Figure 4:
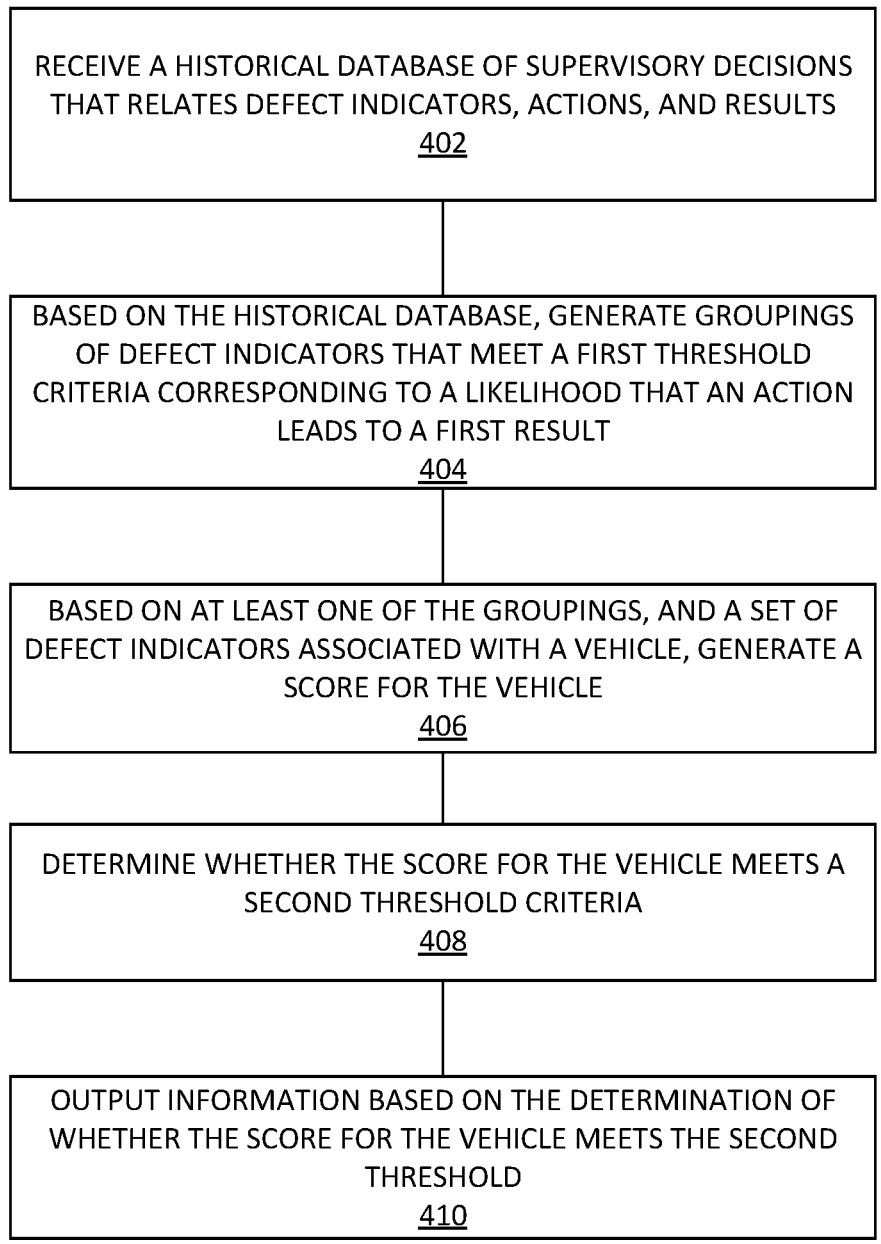
FIG. 4 is a flowchart illustrating a method of selecting vehicles.

FIG. 4 is a flowchart illustrating a method of selecting vehicles. The steps illustrated in FIG. 4 may be performed by one or more elements of system 100. A historical database of supervisory decisions that related defect indicators, actions, and results is received (402). For example, historical defect-vehicle-decision database module 120 may contain a history of all the defects/tasks (i.e., repairs, maintenance, unrepaired problems) that have occurred in association with each vehicle in the fleet. In particular vehicle database module 120 may contain information about the supervisory decision maker 150's decisions whenever a particular defect set was encountered. The supervisory decision maker 150's decision could be to either place a particular vehicle in service (i.e., roll out) or to not place that vehicle in service (i.e., don't roll out.) Pattern analyzer 110 takes as input the historical defect data from historical defect-vehicle-decision database module 120.

Based on the historical database, grouping of defect indicator that meet a first threshold criteria corresponding to a likelihood that an action leads to a first result (404). For example, from the received historical defect data, pattern analyzer 110 can develop item sets of defects which, if present, are associated with a significant proportion of transitions to an out-of-service state (e.g., a breakdown) as compared remaining in service.

Based on at least one of the groupings, and a set of defect indicators associated with a vehicle, a score for a vehicle is generated (406). For example, pattern analyzer 110 can create a score for each current vehicle as detailed in Table 7 or Table 8. It is determined whether the score for the vehicle meets a second threshold criteria (408). For example, scores are generated for each vehicle's current set of defects (if any), the vehicles may be ranked based on the scores. In addition, the scores may be compared to a threshold to classify vehicles as either 'down or 'available.' The threshold may be determined by separating the information in the entire defect-vehicle-decision database module 140 into training data, validation data, and testing data.

Information is output based on the determination of whether the score for the vehicle meets the second threshold (410). For example, alert generator 130 may generate and display alerts to the supervisory decision maker 150 (e.g., human supervisor). These alerts may be displayed in a fashion that indicates the severity of the problem detected. (e.g. red alert if the confidence is above a certain threshold, orange alert for a medium confidence problem and so on.)

Figure 5:
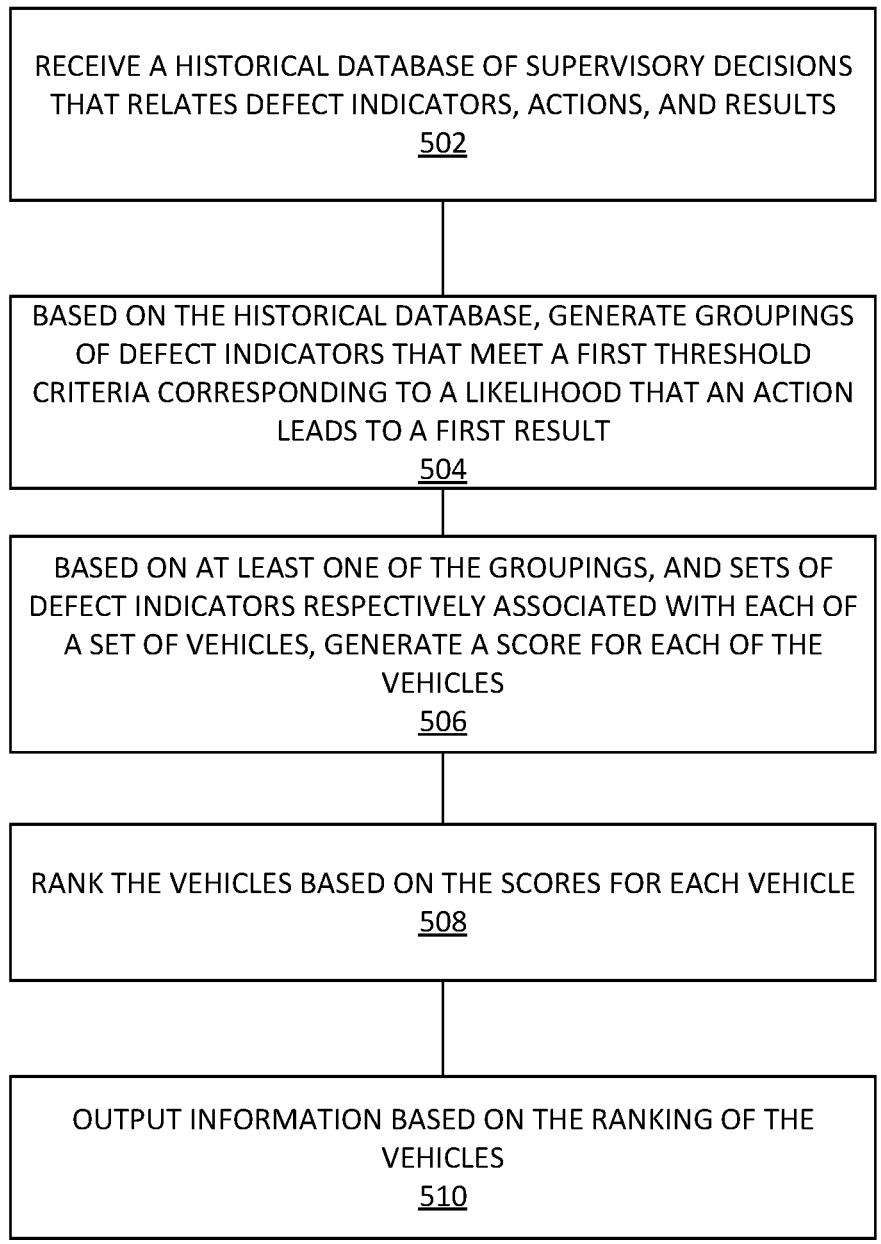
FIG. 5 is a flowchart illustrating a method of ranking vehicles.

FIG. 5 is a flowchart illustrating a method of ranking vehicles. The steps illustrated in FIG. 5 may be performed by one or more elements of system 100. A historical database of supervisory decisions that related defect indicators, actions, and results is received (502). For example, historical defect-vehicle-decision database module 120 may contain a history of all the defects/tasks (i.e., repairs, maintenance, unrepaired problems) that have occurred in association with each vehicle in the fleet. In particular vehicle database module 120 may contain information about the supervisory decision maker 150's decisions whenever a particular defect set was encountered. The supervisory decision maker 150's decision could be to either place a particular vehicle in service (i.e., roll out) or to not place that vehicle in service (i.e., don't roll out.) Pattern analyzer 110 takes as input the historical defect data from historical defect-vehicle-decision database module 120.

Based on the historical database, grouping of defect indicator that meet a first threshold criteria corresponding to a likelihood that an action leads to a first result (504). For example, from the received historical defect data, pattern analyzer 110 can develop item sets of defects which, if present, are associated with a significant proportion of transitions to an out-of-service state as compared remaining in service.

Based on at least one of the groupings, and sets of defect indicators respectively associated with each of a set of vehicles, generate a score for each of the vehicles (506). For example, pattern analyzer 110 can create a score for each current vehicle in the fleet as detailed in Table 7 or Table 8. The vehicles are ranked based on the scores for each vehicle (508). For example, the scores generated for each vehicle's current set of defects (if any) may be used to rank the vehicles.

Information is output based on the ranking of the vehicles (510). For example, alert generator 130 may generate and display a ranking of the vehicles in the fleet to the supervisory decision maker 150 (e.g., human supervisor). This ranking may be displayed in a fashion that indicates the severity of the problems detected. (e.g. red color for vehicles where the confidence is above a certain threshold, orange color for a medium confidence, and so on.)

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

Figure 6:
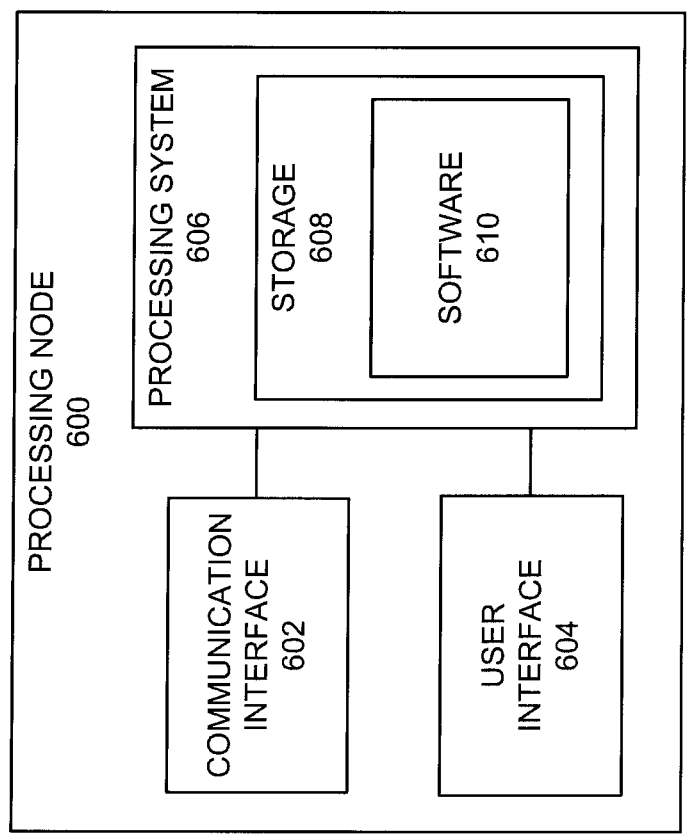
FIG. 6 illustrates a processing node.

FIG. 6 illustrates an exemplary processing node 600 comprising communication interface 602, user interface 604, and processing system 606 in communication with communication interface 602 and user interface 604. Processing node 600 is capable of paging a wireless device. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for reducing vehicle deterioration, the method comprising:
utilizing at least one processing system executing computer-readable code to perform multiple steps including:
determining, from a historical database that relates, for a fleet of vehicles, defect indicators, actions, including actions to put the vehicles into service and to remove the vehicles from service, and results indicating a next status of the vehicles, a plurality of defect indicator groupings that meet a first threshold criteria, the first threshold criteria corresponding to a likelihood that the action to put a given vehicle into service leads to the given vehicle having the next status of unavailable, the plurality of defect indicator groupings generated by a pattern analyzer including an artificial neural network, the artificial neural network trained to generate the defect indicator groupings based on executing an apriori based frequent pattern algorithm performing an analysis of vehicle failures following the actions to put the vehicles into service;
based on at least one of the defect indicator groupings, and a set of defect indicators associated with a subject vehicle from the fleet of vehicles, utilizing the pattern analyzer to generate a score for the subject vehicle;
determining whether the score for the subject vehicle meets a second threshold criteria; and
outputting information based on the determination that the score for the subject vehicle meets the second threshold criteria, the information including an alert and a recommendation for vehicle maintenance.

2. The method of claim 1, wherein the next status for the vehicles in the fleet of vehicles is one of available and unavailable.

3. The method of claim 2, wherein the historical database is derived from the actions to put the vehicles in the fleet of vehicles into service.

4. The method of claim 3, further comprising:
generating a respective score associated with each vehicle in the fleet of vehicles based on a corresponding set of defect indicators associated with each vehicle.

5. The method of claim 4, further comprising:
ranking the vehicles in the fleet of vehicles based on the respective score associated with each vehicle,
outputting information based on the ranking of each vehicle.

6. A method for reducing vehicle deterioration, the method comprising:
utilizing at least one processing system executing computer-readable code to perform multiple steps including:
providing a task database to a pattern analyzer including an artificial neural network,
the task database including respective historical defect indicators associated with respective vehicles of a set of vehicles and at least one action, the at least one action including at least a decision to put a vehicle from the set of vehicles into service and a decision to remove any vehicle from the set of vehicles from service, the artificial neural network trained by executing an apriori based frequent pattern algorithm performing an analysis of failures following the decision to put the vehicle into service, the pattern analyzer determining, for a plurality of sets of historical defect indicators, key-value pairs corresponding to respective sets of historical defect indicators and a respective ratio corresponding to a first frequency of vehicles being taken out of service to a second frequency of vehicles remaining in service;
providing the pattern analyzer including the artificial neural network with respective current sets of defect indicators associated with a current status of respective vehicles of the set of vehicles, the pattern analyzer, based on the respective current sets of defect indicators and the key-value pairs, determining confidence scores that correspond to a likelihood the respective vehicles of the set of vehicles will remain in service;
providing an alert generating module with the confidence scores; and
outputting information about at least one vehicle of the set of vehicles based on the confidence scores, the information including an alert and a recommendation for vehicle maintenance.

7. The method of claim 6, wherein at least one of the actions includes a decision to place a respective vehicle of the set of vehicles into service that was incorrect.

8. The method of claim 6, wherein the task database is derived from the action including the decision to put the vehicle in the set of vehicles into service.

9. A method for reducing vehicle deterioration, the method comprising:
utilizing at least one processing system executing computer-readable code to perform multiple steps including:
receiving a historical database related to a set of vehicles, the historical database relating defect indicators, actions, and results, wherein the actions include actions placing vehicles in service and actions removing vehicles from service and the results include an available status and an unavailable status;
based on the historical database, utilizing a pattern analyzer including an artificial neural network for generating groupings of defect indicators that meet a first threshold criteria corresponding to a likelihood that the action placing the vehicle in service leads to a first result, the artificial neural network being trained to generate the groupings of defect indicators based on executing an apriori based frequent pattern algorithm performing an analysis of vehicle failures following the actions placing the vehicles in service;
based on at least one of the groupings of defect indicators, and a set of defect indicators associated with a subject vehicle, utilizing the pattern analyzer for generating a score for the subject vehicle;
determining whether the score for the subject vehicle meets a second threshold criteria; and
outputting information based on the determination of whether the score for the subject vehicle meets the second threshold criteria, the information including an alert and a recommendation for vehicle maintenance.

10. The method of claim 9, wherein the results correspond to whether the vehicles in the set of vehicles subsequently became unavailable after being subject to the action placing the vehicles in service.

11. The method of claim 9, wherein the historical database is derived from the actions placing respective vehicles in the set of vehicles in service.

12. The method of claim 11, further comprising:
generating a score associated with each vehicle in the set of vehicles based on respective sets of defect indicators associated with each vehicle;
ranking respective vehicles in the set of vehicles based on the score associated with the respective vehicles; and,
outputting information based on the ranking of respective vehicles.

* * * * *